United States Patent [19]

Winters et al.

[11] 3,927,812
[45] Dec. 23, 1975

[54] CARRYING HANDLE

[76] Inventors: Russell M. Winters; Frederick Sell, both of 1257 S. Crissey Road, Holland, Ohio 43528

[22] Filed: Jan. 25, 1974

[21] Appl. No.: 436,734

[52] U.S. Cl. .............................. 224/48 R; 229/52 A
[51] Int. Cl.² .......................................... B65D 5/46
[58] Field of Search ...... 224/45 R, 45 P, 45.8, 45.6, 224/45.4, 48 R, 48.3, 48.4, 49–57; 294/27 H, 27 R; 229/52 A; 16/114 R

[56] References Cited
UNITED STATES PATENTS

| | | | |
|---|---|---|---|
| 823,258 | 6/1906 | Burton et al. | 224/53 |
| 1,707,528 | 4/1929 | Bombard et al. | 229/52 A |
| 2,087,309 | 7/1937 | Stumpf | 224/45 H |
| 2,289,824 | 7/1942 | Brogden | 229/52 A |
| 2,565,006 | 8/1951 | Trickey | 224/52 |
| 2,690,289 | 9/1954 | Claus et al. | 229/52 A |
| 2,951,615 | 9/1960 | Crane | 229/52 A |
| 3,172,586 | 3/1965 | Lu | 224/55 |
| 3,262,283 | 7/1966 | Taylor | 224/45 R |
| 3,726,558 | 4/1973 | Klygis | 224/45 P |

*Primary Examiner*—Robert J. Spar
*Assistant Examiner*—Kenneth Noland
*Attorney, Agent, or Firm*—James D. McNeil

[57] ABSTRACT

A flat for greenhouse plants and flowers is disclosed. The flat has a bottom, sidewalls, end walls and a lifting and carrying handle. The carrying handle comprises a pair of parallel and spaced cross-member straps and a central strap extending between the cross-member straps. Retaining means are provided on the cross-member straps. The carrying handle is removably attached to the flat by inserting the ends of the cross-member straps into a plurality of slots formed in the sidewalls to allow lifting and carrying of the flat by the handle.

3 Claims, 5 Drawing Figures

U.S. Patent   Dec. 23, 1975   3,927,812
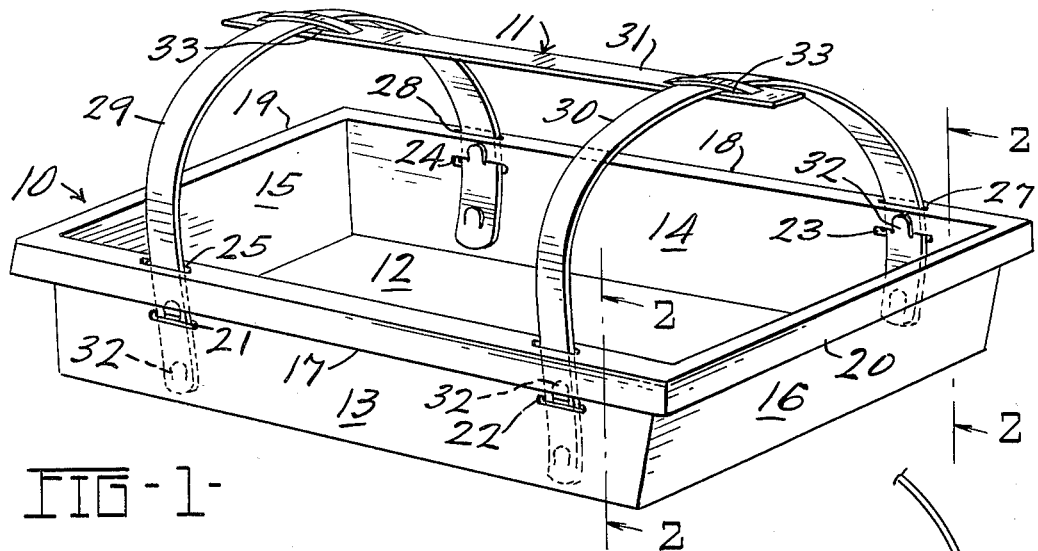
FIG-1-
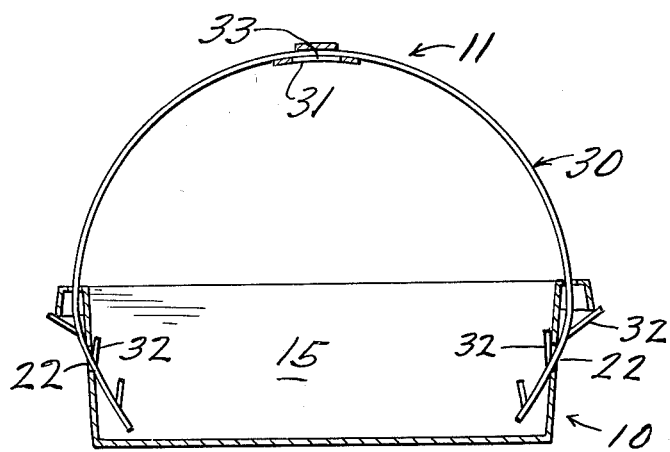
FIG-2-
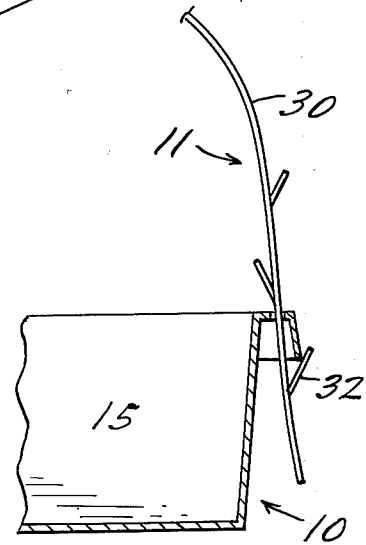
FIG-3-
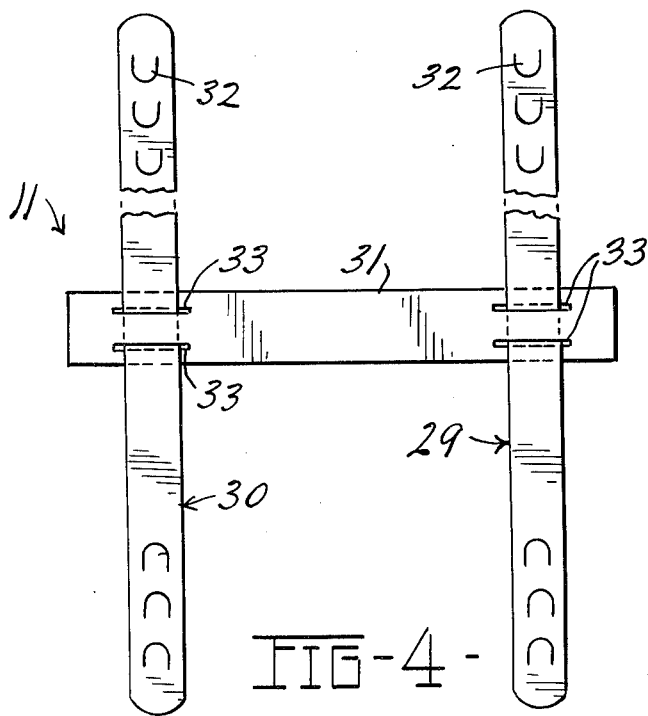
FIG-4-
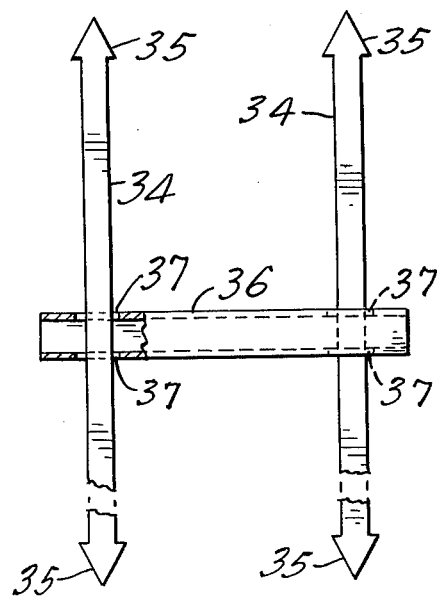
FIG-5-

CARRYING HANDLE

BACKGROUND OF THE INVENTION

This invention relates to an improved construction for a greenhouse flat.

Todays modern greenhouse, whether raising plants and flowers for the wholesale market, retail market or both, uses a large number of plastic carrying trays, usually referred to in the trade as flats. The young growing plants are first started from seeds and after a period of growth, the seedlings are transplanted into flats. Customers, both wholesale and retail, can then purchase flowers or plants in these flats. The flat which is in common use has a perforate bottom to allow watering of the plants, and an extending lip around the sides and ends of the substantially rectangular flat to allow gripping of the container for lifting and carrying the container. Although this construction allows easy stacking of the flats when they are empty, such a structure is awkward to carry. The awkwardness of the flat when loaded makes it susceptible to being dropped. In addition, only one flat can be carried at one time, since the construction necessitates the use of both hands when lifting and carrying the flat.

SUMMARY OF THE INVENTION

The instant invention consists of an improved construction of a flat for carrying plants and flowers. The improved construction comprises a removable handle for lifting and carrying the flat. The handle has a pair of parallel, cross-member straps which are removably connected at their ends to the sidewalls of the flat and a central strap extending between the cross-member straps. The sidewalls have a plurality of slot openings. The ends of the cross-member straps are inserted into the slot openings and have disengageable retaining means on their ends which provide for easy insertion and removal of the handle.

It is, therefore, a primary object of the present invention to provide an improved greenhouse flat.

Another object of the invention is to provide an improved greenhouse flat which has a detachable lifting and carrying handle.

Other objects and advantages of the invention will become apparent from the following detailed description.

BRIEF DESCRIPTION OF THE DRAWINGS

FIG. 1 is a view in perspective of a greenhouse flat embodying this invention;

FIG. 2 is a vertical sectional view taken from the position indicated by the line 2—2 in FIG. 1 and illustrating how a carrying handle is attached;

FIG. 3 is a fragmentary vertical sectional view, similar in part to FIG. 2 and illustrating an alternative way for attaching the carrying handle, being shown on an enlarged scale;

FIG. 4 is a fragmentary plan view of the carrying handle shown in FIG. 1; and

FIG. 5 is a view similar to FIG. 4 but on a smaller scale and showing a modified form of carrying handle.

DESCRIPTION OF THE PREFERRED EMBODIMENTS

According to the present invention, an improved greenhouse flat with detachable lifting and carrying means is provided.

Referring to FIG. 1, a greenhouse flat 10 and a lifting and carrying handle 11, embodying the invention, are shown. The carrying handle 11 is shown attached to the greenhouse flat 10.

The greenhouse flat 10 has a bottom 12, and four upwardly extending sidewalls 13, 14, 15 and 16. Each sidewall has a continuous outwardly extending lip 17, 18, 19 and 20, respectively, on its upper edge. Sidewalls 13 and 14 have slots 21, 22, 23 and 24 therein. The lips 17 and 18 have similar sized slots 25, 26, 27 and 28 in their top surfaces. The flat 10 is generally of shallow proportions forming an open-top container with a perforate bottom. In the open-top container just described, flowers and plants are easily transplanted for shipment, display and ultimate sale.

In the illustrative embodiment shown, a detachable lifting and carrying handle is shown in attached position. The carrying handle 11 is made out of a suitable plastic material, such as, for example, nylon sheeting, polypropylene or polyethylene. The carrying handle 11 has a pair of parallel and spaced cross-member straps 29 and 30, and a central strap 31 extending therebetween. Each of the cross-member straps 29 and 30 has a series of retaining flaps 32 formed near its ends. The central strap 31 is connected to the cross-member straps 29 and 30 by sliding the straps 29 and 30 through pairs of cross-slots 33 adjacent its ends.

As shown in FIGS. 1–3, the lifting and carrying handle 11 has a series of retaining flaps 32 formed on the ends of the cross-member straps 29 and 30, which provides for adjustment of the height of the handle 11 above the sidewalls. In addition, if the one or more of the retaining flaps 32 tears or is damaged, the handle 11 can still be used by merely adjusting the height of the handle so that another of the retaining flaps can be used.

FIG. 3 illustrates a modified embodiment of the invention. In FIG. 3, a cross-member strap 30 is shown passing through the lips 17 and 18 in such a manner that the retaining flaps 32 catch against the underside of the lips 17 and 18. This embodiment eliminates the necessity for providing slots in the sidewalls.

The carrying handle 11 described hereinabove is shown in more detail in FIG. 4.

In FIG. 5, a modified form of carrying handle 11 is shown. In this embodiment each of a pair of cross-member straps 34 has a single retainer tab 35 at its ends, and a central strap 36 of a suitable plastic tubing material such as polypropylene or polyethylene, having pairs of cross-slots 37 adjacent its ends.

We claim:

1. A greenhouse flat for holding and carrying plants and flowers, said flat having a bottom and an upstanding sidewall around said bottom and a lifting and carrying handle comprising a central strap adapted to be carried by hand, and a pair of parallel spaced cross-member straps extending arcuately over said bottom and sidewall transversely to said central strap, each of said cross-member straps having ends removably attached to said sidewall, said central strap extending longitudinally between said cross-member straps, wherein said central strap has a cross slot adjacent each of its ends, each of such cross slots receiving a respective one of said cross-member straps.

2. A greenhouse flat for holding and carrying plants and flowers, said flat having a bottom and an upstanding sidewall around said bottom and a lifting and carrying handle comprising a central strap adapted to be carried by hand, and a pair of parallel spaced cross-member straps extending arcuately over said bottom and sidewall transversely to said central strap, each of said cross-member straps having ends removably attached to said sidewall, said central strap extending longitudinally between said cross-member straps, wherein said sidewall includes a continuous outwardly extending lip on its upper edge, said lip having a first plurality of slot openings, said sidewall also having a second plurality of slot openings, each of said second plurality of slot openings being in an aligned relationship with the respective one of said first plurality of slot openings.

3. A greenhouse flat for holding and protecting plants and flowers comprising a bottom, upwardly diverging side and end walls and an outwardly extending lip on at least said sidewalls, said lip and sidewalls having adjacent aligned slots, and a detachable lifting and carrying handle comprising a longitudinally extending central strap adapted to be carried by hand and a pair of parallel spaced crossmember straps extending transversely to said central strap and having ends received by such aligned pairs of said lip slots and said sidewall slots, and means on said straps adjacent said ends for retaining said cross-member straps in said slots, said central strap extending between and being attached to said cross-member straps.

* * * * *